United States Patent
Griffin et al.

(10) Patent No.: US 11,086,665 B2
(45) Date of Patent: Aug. 10, 2021

(54) SCHEDULING SERVICES FOR QUANTUM COMPUTING

(71) Applicant: Red Hat, Inc., Raleigh, NC (US)

(72) Inventors: Leigh Griffin, Waterford City (IE); Luigi Zuccarelli, Waterford City (IE)

(73) Assignee: Red Hat, Inc., Raleigh, NC (US)

(*) Notice: Subject to any disclaimer, the term of this patent is extended or adjusted under 35 U.S.C. 154(b) by 466 days.

(21) Appl. No.: 16/167,167

(22) Filed: Oct. 22, 2018

(65) Prior Publication Data
US 2020/0125402 A1     Apr. 23, 2020

(51) Int. Cl.
| | |
|---|---|
| *G06F 3/00* | (2006.01) |
| *G06F 9/48* | (2006.01) |
| *G06F 9/54* | (2006.01) |
| *G06F 9/38* | (2018.01) |
| *G06F 15/16* | (2006.01) |
| *G06F 9/50* | (2006.01) |

(Continued)

(52) U.S. Cl.
CPC ......... *G06F 9/4881* (2013.01); *G06F 9/3877* (2013.01); *G06F 9/5027* (2013.01); *G06F 9/542* (2013.01); *G06F 11/0754* (2013.01); *G06F 15/16* (2013.01); *G06N 10/00* (2019.01)

(58) Field of Classification Search
CPC ......... G06G 9/54; G06N 10/00; G06F 9/5027
USPC ........................................... 719/310
See application file for complete search history.

(56) References Cited

U.S. PATENT DOCUMENTS

| | | | |
|---|---|---|---|
| 7,889,992 B1* | 2/2011 | DiVincenzo | B82Y 10/00 398/115 |
| 2007/0257201 A1* | 11/2007 | Kent | H04B 10/70 250/442.11 |

(Continued)

FOREIGN PATENT DOCUMENTS

| | | |
|---|---|---|
| CN | 103699446 | 2/2017 |
| CN | 107562535 | 1/2018 |
| WO | WO2017132603 | 8/2017 |

OTHER PUBLICATIONS

T. F. Watson 1, A programmable two-qubit quantum processor in silicon. (Year: 2018).*

(Continued)

*Primary Examiner* — Lechi Truong
(74) *Attorney, Agent, or Firm* — Lowenstein Sandler LLP

(57) ABSTRACT

Aspects of the disclosure provide for mechanisms for scheduling execution of quantum algorithm. A method of the disclosure includes: receiving a request to execute a quantum algorithm at a quantum computer system, determining whether the one or more execution environment requirements from the request are satisfied in view of the state of the quantum computer system, responsive to determining that the one or more execution environment requirements are not satisfied in view of the state of the quantum computer system, causing an execution of the quantum algorithm to be delayed until the one or more execution environment requirements are satisfied, and responsive to determining that the one or more execution environment requirements are satisfied in view of the state of the quantum computer system, forwarding the request to execute the quantum algorithm to the quantum computer system to cause the execution of the quantum algorithm.

20 Claims, 6 Drawing Sheets

(51) Int. Cl.
*G06F 11/07* (2006.01)
*G06N 10/00* (2019.01)

(56) References Cited

U.S. PATENT DOCUMENTS

| | | | |
|---|---|---|---|
| 2011/0202988 A1* | 8/2011 | Otranen | H04L 9/3213 |
| | | | 726/8 |
| 2017/0171291 A1* | 6/2017 | Allen | H04L 67/1025 |
| 2017/0330101 A1 | 11/2017 | Hastings et al. | |
| 2019/0042392 A1* | 2/2019 | Matsuura | G06N 10/00 |
| 2019/0230182 A1* | 7/2019 | Martin | H04L 67/2842 |
| 2019/0251478 A1* | 8/2019 | Bishop | H03K 3/38 |
| 2020/0160205 A1* | 5/2020 | Leipold | G06F 15/7807 |
| 2020/0311593 A1* | 10/2020 | Gidney | G11C 11/4063 |

OTHER PUBLICATIONS

Khammassi et al., "QX: A High-Performance Quantum Computer Simulation Platform,"QuTech, Computer Engineering Lab, Delft University of Technology, Mar. 27-31, 2017, 6 pages.
Montanaro, Ashley, "Quantum algorithms: an overview," [retrieved from nature.com/articles/hpjqi201523], Jan. 12, 2016, 8 pages.
Wecker et al., "LIQUi: A Software Design Architecture and Domain-Specific Language for Quantum Computing," [retrieved from https://arxiv.org/pdf/1402.4467.pdf], Feb. 18, 2014, 14 pages.

* cited by examiner

411

413 //@optimize: efficiency

415 //@error_rate_threshold: 5

417 //@channel_load_rate threshold: 70

//@coherence_threshold: [100,100,100,100,100]

OPENQASM 2.0 include "qelib1.inc";

419 // Qubit setup qreg q[5];

creg c[2];

// Gate manipulation h q[0];
420 h q[1];   — 430
h q[2];   — 431 s q[0];
421 s q[1];   — 433
423 s q[2];   — 435 cx q[1],q[2];

FIG. 4

SCHEDULING SERVICES FOR QUANTUM COMPUTING

TECHNICAL FIELD

The implementations of the disclosure generally relate to computer systems and, more specifically, to scheduling services for quantum computing.

BACKGROUND

Quantum computers perform computations utilizing quantum-mechanical phenomena, such as superposition and entanglement. Unlike classical computers that process data encoded in binary bits, each of which is always in one of two definite states ("0" or "1"), quantum computers process data in units of quantum bits (qubits) that can be in superpositions of states. "Superposition" refers to the ability of each qubit to represent both a "1" and a "0" at the same time. The qubits in a superposition can be correlated with each other (referred to as "entanglement"). That is, the state of a given qubit (whether it is a "1" or a "0") can depend on the state of another qubit. A quantum computer with N qubits can be in a superposition of up to $2^N$ states simultaneously. Compared to the classical computers that can only be in one of these $2^N$ states at a particular time, quantum computers have higher compute power and may solve difficult problems that are intractable using the classical computers.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 4 illustrates an example of a quantum assembly file in accordance with some embodiments of the disclosure.

DETAILED DESCRIPTION

Figure 1:
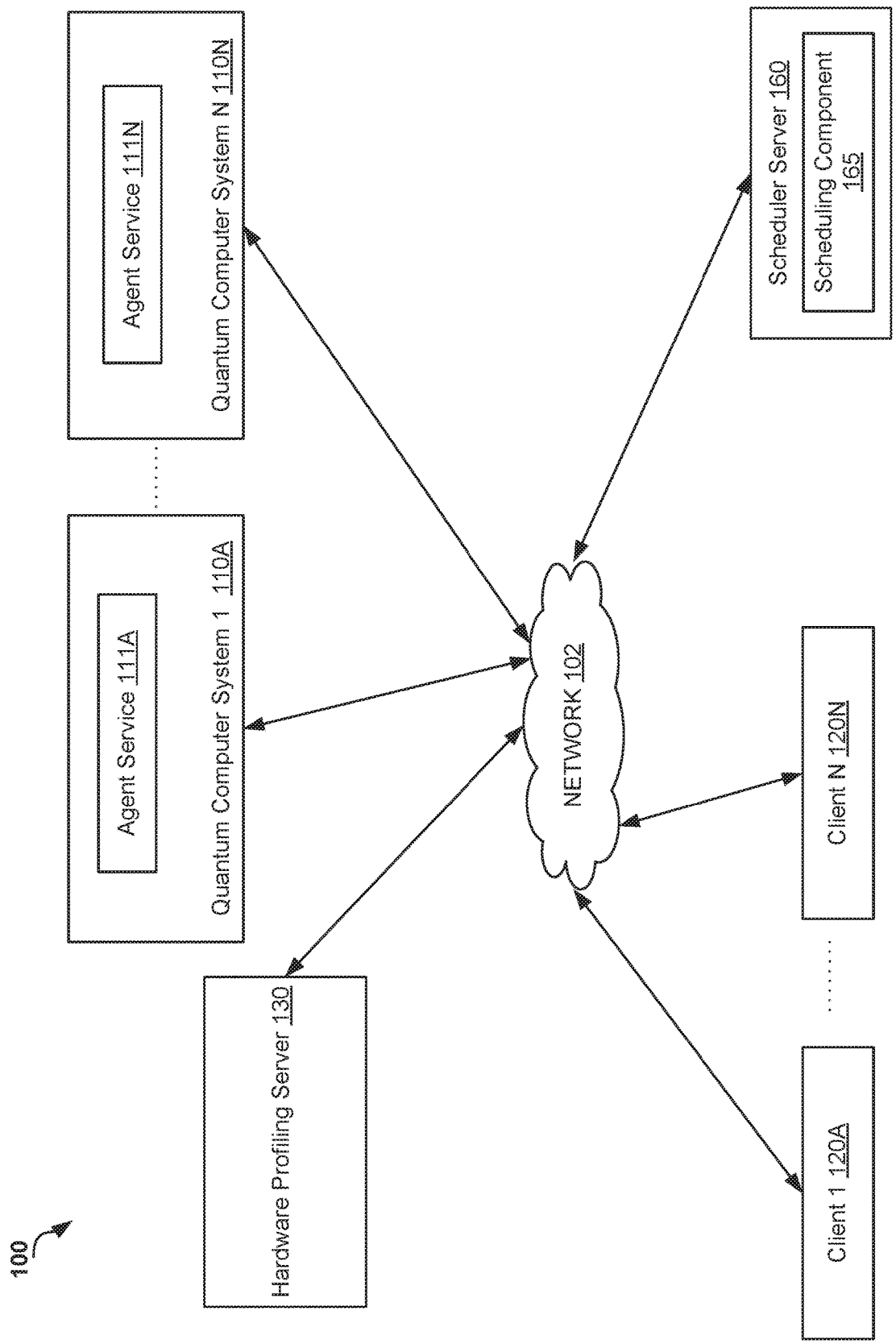
FIG. 1 is a block diagram of a network architecture in which implementations of the disclosure may operate.

Quantum computing utilizes quantum-mechanical phenomena, such as superposition and entanglement. Quantum computing may involve initializing the quantum states of a set of quantum bits (qubits), allowing the quantum states of the qubits to evolve under the influence of quantum gates, and observing (e.g., measuring) the qubits after they have evolved. As referred to herein, a qubit is a basic unit of quantum information that can be used in quantum computing. The qubit may be regarded as a quantum system that exists in quantum superpositions of two independent quantum states. The probability that the quantum system is in a particular quantum state at a given time is not zero. An example of such a quantum system is the spin of an electron, wherein the up or down spin can correspond to a zero, a one, or a superposition of states in which it is both up and down at the same time. The spin-up and the spin-down state may be referred to as the state of "|0>" and the state of "|1>," respectively. Performing a calculation using the electron involves performing the calculation simultaneously for both a zero and a one. As such, the qubit can be both a zero and a one at the same time. The qubit can be in one or more quantum states, such as the state of "|0>," the state of "|1>," or a linear combination of the states of "|0>" and "|1>" (a superposition of the states of "0>" and "|1>"). At a particular time, the qubit may be regarded as being in a superposition of the states of "|0>" and "|1>" N qubits may provide a system with a state that is a combination of $2^N$ states simultaneously.

As referred to herein, a quantum gate may be a logic gate operating on one or more qubits. Applying the logic gate to the one or more qubits may be regarded as performing one or more operations defined by linear algebra over Hilbert space and represented by unitary matrices. The quantum gate may be reversible (e.g., receiving an input of n-bit data and returning an output of n-bit data). The quantum gate may control the evolution of distinguishable quantum states of the qubits and define calculations corresponding to the evolution. This evolution may be regarded as performing $2^N$ simultaneous calculations. The output of the quantum gate may be determined by measuring the quantum states of the qubits after the evolution. Examples of the quantum gate may include a Hadamard gate, a Pauli-X gate, a Pauli-Y gate, a Pauli-z gate, a swap gate, a phase shift gate, etc. A quantum gate operating on one qubit may be referred to as a "single-qubit gate" herein. A quantum gate operating on multiple qubits may be referred to as a "multi-qubit gate" herein.

As referred to herein, a "quantum computer system" may be a device that is capable of performing quantum computing. A quantum computer system may implement or execute an algorithm (i.e., quantum algorithm) defined by a sequence of quantum gates and initial values of one or more qubits. The implementation of the quantum algorithm may end with a measurement, collapsing the system of qubits into one of $2^N$ states, where each of the qubits is zero or one. The algorithm may implement any suitable function. Examples of the quantum algorithm may include an algorithm for public-key cryptography, an algorithm for searching for a specified entry (e.g., an entry of specified features) in an unordered data set, an algorithm for setting two qubits in an entangled state, an algorithm for determining the exclusive-or (XOR) mask over which a given black-box function is invariant, etc.

As discussed above, a quantum computer system with N qubits may be in a superposition of up to $2^N$ states simultaneously. As such, the processing capacity of the quantum computer system is limited by the number of qubits available in the quantum computer system. In addition, it is expensive to build and maintain quantum computer systems. Performing computations in the quantum computer systems is similarly expensive. Accordingly, requirements for an execution environment at the quantum computer systems may be imposed on a quantum computer system to perform computations for accurate, reliable, and efficient quantum computing. Conventional solutions for quantum computing fail to provide mechanisms for scheduling executions for the quantum computer system in accordance with execution environment requirements, resulting in time-consuming and costly overhead executions of quantum algorithms using quantum computer systems.

Aspects of the disclosure address the above deficiencies and other deficiencies of conventional quantum computing mechanisms by providing an approach systems, methods, computer-readable medium, etc.) that can schedule executions of quantum algorithms responsive to execution environment requirements for implementing the quantum algorithms in quantum computer systems being satisfied. A scheduling component in accordance with the disclosure can receive requests to execute quantum algorithm(s). A request may include an instruction(s) to perform an operation on a qubit that is provided by a quantum computer system and a statement(s) specifying at least one execution environment requirement for the quantum computer system. Such requirement may be specific to a qubit provided by the quantum computer system or for the quantum computer system itself.

The scheduling component may determine whether the execution environment requirement(s) is satisfied by a current execution environment at, or state of, a quantum computer system. If the execution environment requirement(s) is satisfied, the scheduling component may forward the request to the quantum computer system for an immediate execution. On the other hand, if the execution environment requirement(s) is not satisfied, the scheduling component may delay the execution until the execution environment requirement(s) is satisfied. The scheduling component may not schedule any executions in response to determining that a quantum algorithm has been previously executed.

Accordingly, aspects of the disclosure provide for scheduling executions of algorithms depending on an execution environment or a state of quantum computer systems. Compared to conventional quantum computing techniques, the techniques disclosed herein may avoid running an algorithm on an over-processed and/or over-powered quantum computing machine. Executing algorithms on such machine would be more expensive because an execration result is most likely to be in poor quality and unsatisfactory. Thus, conventional quantum computing techniques would necessarily involve re-running algorithms multiple times until the execution result becomes satisfactory. As such, an execution of algorithms should be reserved for appropriate timing as provided by the disclosure, which would result in efficient and accurate quantum computing.

FIG. 1 is a block diagram of an example of a computer system 100 according to some embodiments of the disclosure. As illustrated, the computer system 100 may include one or more quantum computer systems (e.g., quantum computer systems 110A-110N), client devices (e.g., clients 120A-120N), a hardware profiling server 130, a scheduler server 160, and/or any other suitable component in accordance with the present disclosure.

The quantum computer system 110A-110N, the clients 120A-120N, the hardware profiling server 130 and the scheduler server 160 may be connected via a network 102, which may be a private network (e.g., a local area network (LAN), a wide area network (WAN), intranet, or other similar private networks) or a public network (e.g., the Internet).

Each of the quantum computer systems 110A-110N may be any physical system that harnesses quantum-mechanical phenomena t perform computation in terms of qubits. Whereas, each of the clients 120A-120N, the hardware profiling server 130 and the scheduler server 160 may be a classical computing device such as a server, a workstation, a personal computer (PC), a mobile phone, a palm-sized computing device, a personal digital assistant (PDA), and/or any other suitable computing device. "Computer system" as used herein may be and/or include a device comprising one or more processors, one or more memory devices, and one or more input/output (I/O) interfaces. A computer system may be a system including one or more computing devices.

"Processor" or "processing device" as used herein may be and/or include a device capable of executing instructions encoding arithmetic, logical, or I/O operations. In one illustrative example, a processor may follow a Von Neumann architectural model and may comprise an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. According to another aspect of the disclosure, a processor may be implemented as a single integrated circuit, two or more integrated circuits, or may be a component of a multi-chip module (e.g., in which individual microprocessor dies are included in a single integrated circuit package and hence share a single socket). A processor may also be a central processing unit (CPU) in some embodiments.

"Memory device" herein may be and/or include a volatile or non-volatile memory device, such as RAM (random-access memory), ROM (read-only memory), EEPROM (electrically erasable programmable read-only memory), or any other device capable of storing data.

The hardware profiling server 130 may monitor hardware information of the quantum computer systems 110A-110N. For example, the hardware profiling server 130 may communicate with an agent service (e.g., agent services 111A-111N) deployed on a respective quantum computer system 110A-110N to acquire hardware information of the respective quantum computer system. In some implementations, the hardware profiling server 130 may communicate with the agent service 111A deployed on the quantum computer system 110A to acquire hardware information of the quantum computer system 110A.

The hardware information of the quantum computer system 110A-110N may include, but is not limited to, an error rate of the quantum computer system (e.g., a gate error rate, a readout error, a multi-qubit gate error, etc.), coherence time of the quantum computer system and/or qubit or the quantum computer system (e.g., a first coherent time indicative of an amount of time required for a quantum computation, a second coherent time indicative of an amount of time available to perform the quantum computation by the quantum computer system and/or on a qubit provided by the quantum computer system, etc.—coherence time in general means how long a quantum state can be held), load information of the quantum computer system (e.g., a channel load rate indicating how loaded or busy a quantum communication channel within the quantum computer system is), temperature information of the quantum computer system, an activation frequency representative of how frequently the qubits are activated, a qubit capacity of the quantum computer system (e.g., the number of qubits available in the respective quantum computer system), a calibration time indicative the last time when the quantum computer system was calibrated, etc.

The scheduling server 160 may schedule executions of quantum algorithms in accordance with execution environment requirements in view of a current state of the quantum computer systems 110A-110N. For example, a scheduling component 165 can receive a request to execute a quantum algorithm in a form of a file that includes instructions for implementing the quantum algorithm in the quantum computer systems. The file may be, for example, a quantum assembly file, such as a Quantum Assembly Language (QASM) file. An example of the quantum assembly file is illustrated in FIG. 4. The QASM file may include instructions to perform operations on qubits and statements for execution environment requirements. The file may be provided by a client device 120A-120N in some examples.

Examples of the execution environment requirement(s) may include, but are not limited to, an error rate threshold (e.g., the maximum error rate allowed to implement the algorithm(s)) for the quantum computer system, a channel load rate threshold for a quantum communication channel within the quantum computer system (e.g., the maximum load rate of a quantum channel that is allowed to implement the algorithm(s)), a coherence time threshold (e.g., the longest coherence time that is allowed to implement the algorithm(s)) for the quantum computer system and/or for each qubit provided by the quantum computer system, and a temperature threshold (e.g., the minimum temperature allowed to implement the algorithm(s)) for a temperature of the quantum computer system, among other things. Alternatively or in addition, the QASM file may contain a statement for a scheduling optimization option such as "efficiency," "speed," "accuracy," or "real world time." In some embodiments, the execution environment requirements may be provided as metadata separate from the QASM file.

The scheduling component 160 may analyze the QASM file, the hardware information provided by the hardware profiling server 130 and/or any other suitable data and schedule execution of the quantum algorithm(s) in view of the analysis. In some examples, the scheduling component 165 may perform various operations discussed herein with reference to FIGS. 3 and 5.

Figure 2:
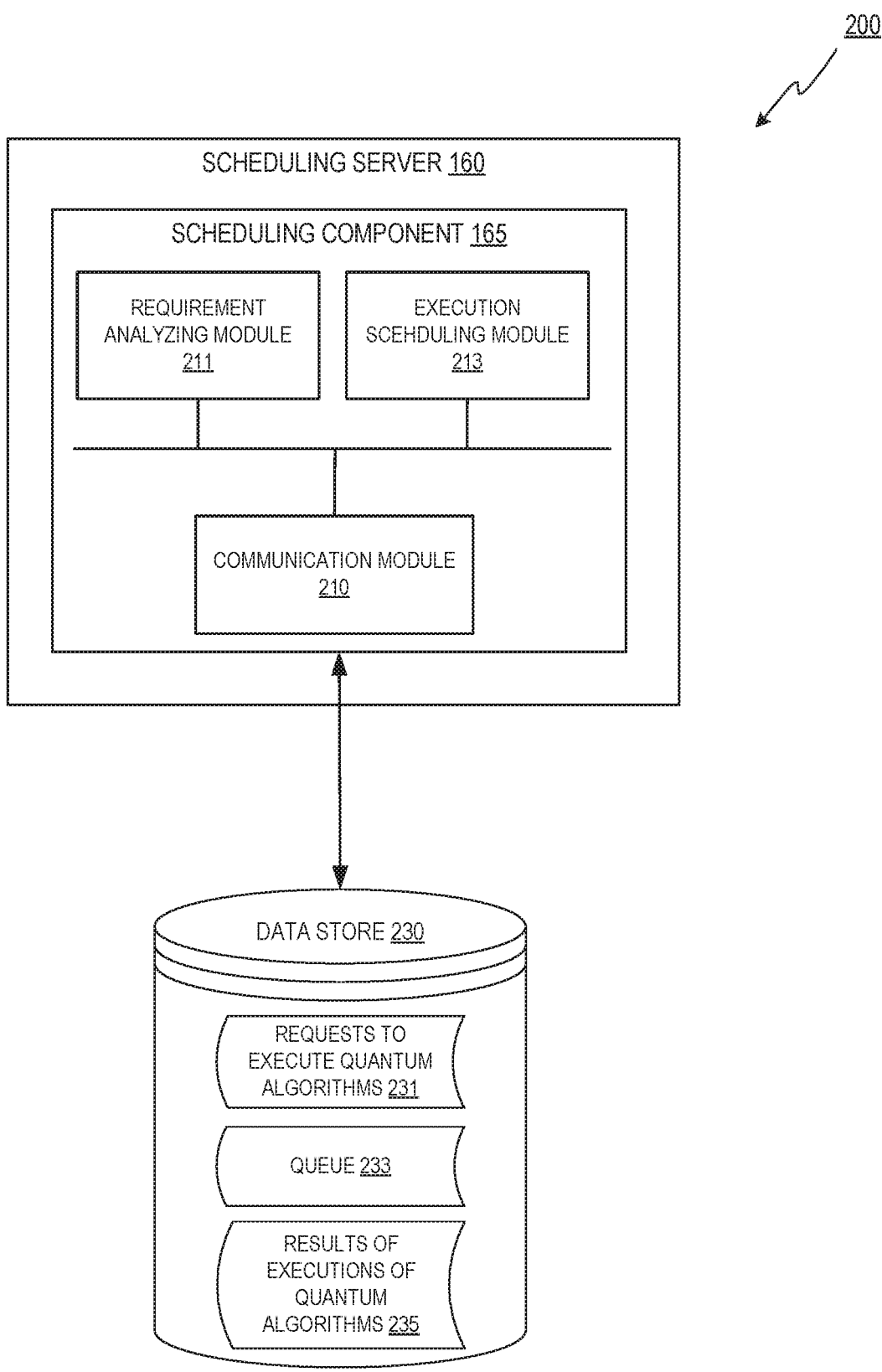
FIG. 2 is a block diagram of a detailed view of a computer system implementing scheduling component according to an implementation of the disclosure.

FIG. 2 depicts a block diagram illustrating an example 200 of a computer system in accordance with some examples of the disclosure. The computer system 200 may include the scheduling server 160. As illustrated, the scheduling server 160 may include the scheduling component 165. Further, the scheduling component 165 may include a communication module 210, a requirement analyzing module 211, and an execution scheduling module 213. The scheduling component 165 may communicate with a data store 230 storing data that can be used to schedule executions of quantum algorithms (e.g., requests to execute quantum algorithms (e.g., QASM files) 231, a queue 233 for requests to be executed later, results of executions of quantum algorithms 235, etc.). More or less components may be included without loss of generality. For example, two or more of the components or portions of the components may be combined into a single component, or one of the components may be divided into two or more modules. In one example, one or more of the modules may be executed by different processing devices on different computing devices (e.g., different server computers).

The communication module 210 may receive requests to execute quantum algorithms from client devices 120A-120N. The communication module 210 may store the received requests in the data store 230. The communication module 210 can further request and receive hardware information about quantum computer systems 110A-110N from the hardware profiling server 130. The communication module 210 may also send the requests to the quantum computer systems 110A-110N for execution. The communication module 210 can receive results of the execution from the quantum computer systems 110A-110N and send the results to client devices 120A-120N that requested execution. The communication module 210 may store the results of executions in association with an identifier of quantum algorithms (or an identifier of requests, or QASM files).

The requirement analyzing module 211 can analyze execution environment requirements included in requests to execute quantum algorithms and hardware information of quantum computer systems 110A-110N to determine whether the execution environment requirements have been satisfied or not. The requirement analyzing module 211 can further send an indication of whether or not the requirements are satisfied to the execution scheduling module 213.

The execution scheduling module 213 can determine a timing of executions of quantum algorithms included in the requests. The execution scheduling module 213 may determine, based on the indication from the requirement analyzing module 211, whether a request to execute a quantum algorithm(s) should be sent to a quantum computer system 110A-110N for an immediate execution, or place the request in a queue 233 for a later execution until the execution environment requirement(s) is satisfied. Moreover, the execution scheduling module 213 may schedule a request to be sent for an immediate execution upon determining that a quantum algorithm(s) of the request has already been executed. In another example, the execution scheduling module 213 may cause executions after a predetermined time period.

Figure 3:
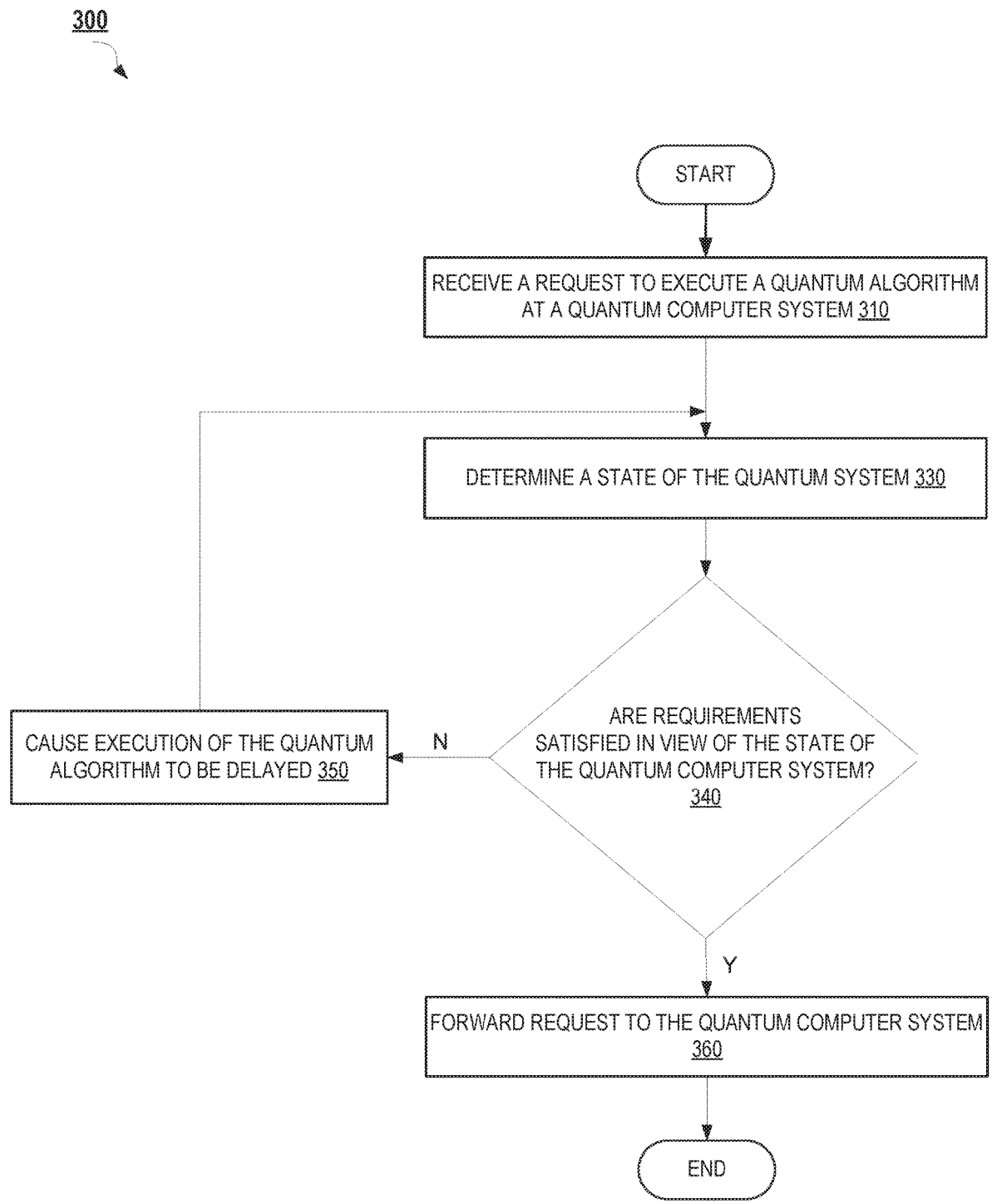
FIG. 3 is a flow diagram illustrating a method for scheduling executions of quantum algorithms at a quantum computer system in accordance with some examples of the disclosure.
Figure 5:
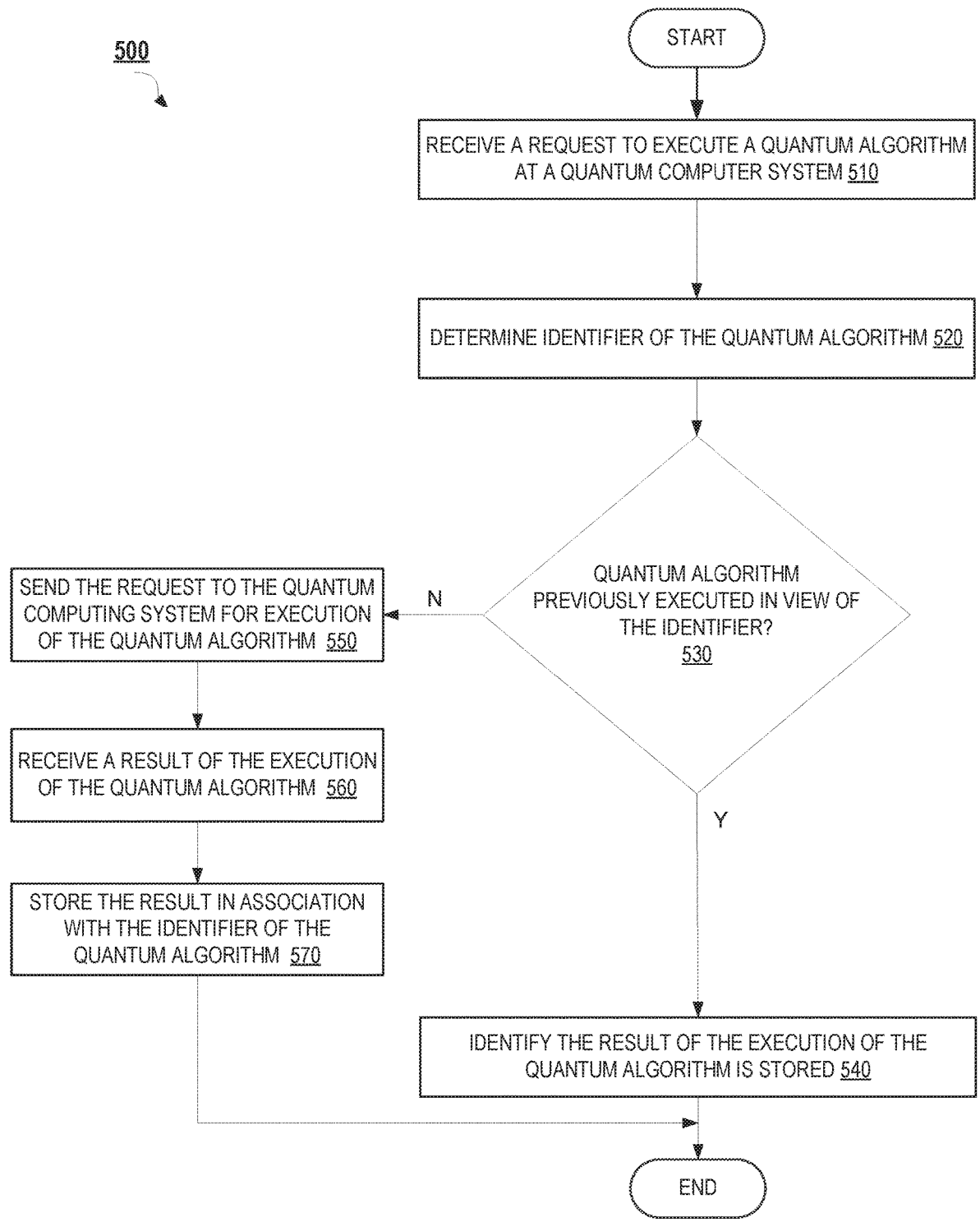
FIG. 5 is a flow diagram a method for scheduling executions of quantum algorithms at a quantum computer system in accordance with some other examples of the disclosure.

FIGS. 3 and 5 are flow diagrams illustrating methods 300 and 500 for a quantum algorithm scheduling service in accordance with one or more aspects of the disclosure. Method 300 illustrates an example process for scheduling executions of quantum algorithms in view of execution environment requirements specified in requests to execute quantum algorithms and a state of quantum computer systems 110A-110N in accordance with some embodiments of the present disclosure. Method 500 illustrates an example process for scheduling executions of quantum algorithms when the algorithms have previously been executed in accordance with some embodiments of the disclosure. Methods 300 and 500 may be performed by processing devices that may comprise hardware (e.g., circuitry, dedicated logic, programmable logic, microcode, curable code (such as is run on a general-purpose computer system or a dedicated machine), or a combination of both.

Methods 300 and 500 and each of their individual functions, routines, subroutines, or operations may be performed by one or more processors of the computer device executing the method. In certain implementations, methods 300 and 500 may each be performed by a single processing thread. Alternatively, methods 300 and 500 may be performed by two or more processing threads, each thread executing one or more individual functions, routines, subroutines, or operations of the method. In an illustrative example, the processing threads implementing methods 300 and 500 may be synchronized (e.g., using semaphores, critical sections, and/or other thread synchronization mechanisms). Alternatively, the processes implementing methods 300 and 500 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation methods 300 and 500 may be performed by the scheduler server 160 as shown in FIG. 1.

Referring to FIG. 3, the method 300 begins at block 310 where a processing device may receive a request to execute a quantum algorithm. The quantum algorithm is to be executed at a quantum computer system connected to the processing device. The processing device may receive the request from a client device connected to the processing device.

The request to execute the quantum algorithm may include statements specifying instructions for implementing the quantum algorithm. In addition, the request may include at least one execution environment requirement for reliable execution of the quantum algorithm at the quantum computer system. The request to execute a quantum algorithm may be in a form of QASM file. An exemplary content of the QASM file is illustrated in FIG. 4.

The QASM file may include instructions or commands for execution the quantum algorithm(s). The QASM file may also include a statement(s). The statement is different from the instruction in that the statement is not for the execution. Rather, a statement provides additional information about the execution such as an execution environment requirement(s). Such statement may be annotated or marked with a special characters) such as "//" and/or "@." Examples of the execution environment requirement(s) may be an error rate threshold (e.g., the maximum error rate allowed to implement the algorithm(s)) for the quantum computer system, a channel load rate threshold for a quantum communication channel within the quantum computer system (e.g., the maximum load rate of a quantum channel that is allowed to implement the algorithm(s)), a coherence time threshold (e.g., the longest coherence time that is allowed to implement the algorithm(s)) for the quantum computer system and/or for each qubit provided by the quantum computer system, and a temperature threshold (e.g., the minimum temperature allowed to implement the algorithm(s)) for a temperature of the quantum computer system, among other things. Details to the content of the QASM file is further described below with reference to FIG. 4.

Alternatively or in addition, the QASM file may contain a statement for a scheduling optimization option such as "efficiency," "speed," "accuracy," or "real world time." The scheduling optimization option may be provided by a user of a client device 120A-120N. For an efficiency option, the processing device may schedule to send the request to execution the quantum algorithm(s) to the quantum computer system responsive to determining that current cohesion time of the quantum computer system meets the corresponding threshold indicated in the execution environment requirement(s). As for a speed option, the processing device may send the request to the quantum computer system when the current channel load rate at the quantum computer system met the channel load rate requirement.

As for an accuracy option, the processing device may determine coherence times of qubits provided by the quantum computer system and an error rate(s) of the quantum computer system when scheduling for the execution. For the real world time option, the processing device may bypass determining any execution environment requirements and send the request to the quantum computer system to execute the quantum algorithm(s) in real time instead of waiting for the optimal time. It would be appreciated that a flag such as a binary value (e.g., 0 or 1) may be used to indicate whether the processing device should schedule the execution regardless of the specified execution environment requirement(s) or wait until all the specified execution environment requirement(s) is met.

At block 330, the processing device may determine a state of the quantum computer system. Examples of the state of the quantum computer system may include an error rate and/or a coherence time of the quantum computer system.

The processing device may communicate with the quantum computer system to determine hardware information via the hardware profiling server 130. For example, the hardware information of the quantum computer system may include an error rate of the quantum computer system (e.g., a gate error rate, a readout error, a multi-qubit gate error, etc.), coherence time of the quantum computer system and/or qubit or the quantum computer system (e.g., a first coherent time indicative of an amount of time required for a quantum computation, a second coherent time indicative of an amount of time available to perform the quantum computation by the quantum computer system and/or on a qubit provided by the quantum computer system, etc.), load information of the quantum computer system (e.g., a channel load rate indicating how loaded or busy a quantum communication channel within the quantum computer system is), temperature information of the quantum computer system, an activation frequency representative of how frequently the qubits are activated, a qubit capacity of the quantum computer system (e.g., the number of qubits available in the respective quantum computer system), a calibration time indicative the last time when the quantum computer system was calibrated, etc.

In particular, the processing device may determine the error rate of the quantum computer system from a gate error rate (the number of errors occurred during employment of one or more quantum gates in a certain period of time) and/or a readout error rate (the number of readout errors incurred when measuring a qubit(s) during a certain period of time).

The gate error rate may be a ti-qubit gate error (e.g., the number of errors occurred during employment of one or more multi-qubit quantum gates in a certain period of time), a single-qubit gate error (e.g., the number of errors occurred during employment of one or more single-qubit quantum gates in a certain period of time), a total gate error (e.g., the number of errors occurred during employment of one or more multi-qubit quantum gates and single-qubit quantum gates in a certain period of time). In an example, the processing device may determine the error rate of the quantum computer system as a combination of or a maximum of the gate error rate and readout error rate.

In another example, the processing device may further determine the error rate contributed by coherence time of the quantum computer system/qubit(s). The processing device may utilize a correlation table that maps a percentage of reliability lost (e.g., 3%) in execution of quantum algorithm(s) for a given coherence time (e.g., 90 microsecond (µs)) of the quantum computer system/qubit(s) from historical data. As still another example, the processing device may determine error rate contribution from other factors such as temperature, activation frequency, calibration, time, and/or qubit capacity of the quantum computer system, in addition or instead of the coherence time.

At block 340, the processing device may determine whether the execution environment requirement(s) is satisfied in view of the state of the quantum computer system.

The processing device may determine execution environment requirement(s) from the request to execute quantum algorithm(s). For example, The processing device may parse each line of the QASM file and identify, from the request, a statement starting with an annotation (e.g., "#@") indicating an execution environment requirement. Once the statement is identified, the processing device may determine an execution environment requirement from the statement. Then, the processing device may compare the execution environment requirement against the current state of the quantum computer system including at least one of an error rate or a coherence time of the quantum computer system.

For example, the processing device may have identified a statement, "//@error_rate_threshold: 5". The processing device may determine that the maximum error rate of the quantum computer system during a predetermined time period should be 5% as the execution environment requirement. Then, the processing device may compare the 5% maximum error rate against the current error rate of the quantum computer system.

As another example, the processing device may determine that a minimum coherence time of the quantum computer system is a 200 µs. In such case, the processing device may determine as a coherence time of the quantum computer system a maximum or average coherence time of qubits provided by the quantum computer system. The processing device may then compare the current coherence time provided by the quantum computer system and the minimum coherence time requirement imposed to determine whether the execution environment requirement(s) is met.

As still another example, the processing device may identify that a minimum coherence time of each qubit provided by the quantum computer system is a 100 µs. As a further example, the processing device may identify different coherence time requirements for different qubits (e.g., [100, 300, 200, 50, 100] for qubit 0 (or "q[0]"), qubit 1 (or "q[1]"), qubit 2 (or "q[1]"), qubit 3 (or "q[3]"), and qubit 4 (or "q[4]"), respectively). The processing device may compare the minimum coherence time requirements against the current qubit state of the quantum computer system to determine whether the required conditions are met.

As still another example, the processing device may identify the maximum quantum channel load rate required is 30%. In such case, the processing device may determine from the current load information of the quantum computer device what the load rate is for a quantum channel(s) available to process the request and determine whether the requirement is met or not. The available quantum channel may be determined by round robin technique or any other predefined algorithm. As a further example, the processing device may determine that the quantum computer system should be at a minimum of 0.025 miliKelvin (mK) and identify whether the requirement is met or not based on the current temperature information of the quantum computer system. It should be appreciated that the execution environment requirements may be deemed to be satisfied when all or a part of the execution environment requirements are met by the current state of the quantum computer system. As still a further example, a particular period since the last calibration may be an execution environment requirement(s) and the processing device may check the calibration time of the quantum computer system to determine whether the particular period has passed or not.

As a further example, responsive to a scheduling optimization option (e.g., efficiency, speed, accuracy, or real world time) being specified in the QASM file, the processing device may schedule the quantum algorithm(s) for execution upon determining that a particular execution environment requirement(s) which is pre-determined to be associated with the scheduling optimization option, is satisfied; otherwise, the processing device may hold the execution until the particular execution environment requirement(s) is satisfied. Accordingly, the processing device may determine the pre-determined execution environment requirement for a respective scheduling optimization option. Specifically, for an efficiency option, it may be a cohesion time threshold of the quantum computer system, for a speed option, a channel load rate threshold, and for an accuracy option, a coherence time threshold(s) of a qubit(s) provided by the quantum computer system and an error rate threshold(s) of the quantum computer system.

On the other hand, if the scheduling optimization option is real world time (i.e., an option for execution in real-time and no scheduling optimization), the processing device may not determine whether the execution environment requirement(s) are satisfied and instead directly proceed to block 360 to send the request to the quantum computer system. After determining the particular execution environment requirement(s), the processing device may determine whether the particular execution environment requirement is satisfied in view of the state of the quantum computer system, as described above. Responsive to determining that the particular execution environment requirement is satisfied, the processing device may determine that the one or more execution environment requirements are satisfied and proceed to block 360. In case the particular execution environment requirement(s) is not satisfied, the processing device may proceed to block 350 as will be described in details below.

At block 350, responsive to determining that the one or more execution environment requirements are not satisfied in view of the state of the quantum computer system, the processing device may cause (i.e., schedule) an execution of the quantum algorithm to be delayed until the one or more execution environment requirements are satisfied. The processing device may place the request to execute the quantum algorithm in a queue and periodically check the state of the quantum computer system to determine whether an execution environment requirement(s) is satisfied or not. Once the execution environment requirement(s) is fulfilled, the processing device may send the request for execution as in block 360. In this way, the processing device may hold or delay the execution until the optimal moment to not waste processing resources in rerunning the execution because poor execution environment would result in unreliable result of the execution.

For example, the error rate threshold may be set to 5%, a channel load rate threshold 20%, and a coherence time threshold for all qubits as 150 µs. The processing device may have determined that an error rate of 7% at the quantum computer system in the past hour and the coherence time for each qubit 200 µs, and a current load rate of 85% for an available quantum channel(s). The error rate may have been influenced by high coherence times and such high coherence times may be due to an increased temperature of the quantum computer system from heavy processing in several quantum channels of the quantum computer system. In such case, the processing device may place the request to execute the quantum algorithm in a queue and determine the state of the quantum computer system on an hourly basis until the state becomes optimal for executing the quantum algorithm. In this way, the processing device may provide a reliable result of the execution as the algorithm can be executed in an optimal environment specified in the request to execute the quantum algorithm. Accordingly, the processing device would not receive the same request again to re-execute the same quantum algorithm.

At block 360, responsive to determining that the one or more execution environment requirements are satisfied in view of the state of the quantum computer system, forwarding the request to execute the quantum algorithm to the quantum computer system to cause the execution of the quantum algorithm.

In an instance, the execution environment requirement(s) may include a qubit state requirements) (e.g., coherence time for a qubit) with respect to a qubit(s) provided by the quantum computer system. Thus, there may be instances where an execution environment requirement for some qubits are satisfied, but not for the other qubits. In such case, the processing device may identify a qubit provided by the quantum computer system having a state by which the execution environment requirement(s) is satisfied. In particular, the processing device may identify the qubit (e.g., q[2]) and parse instruction(s) included in the QASM file that involves the qubit. For example, in coherence time threshold for qubits (e.g., "//@coherence_threshold: [100, 100, 500, 100, 100]"), the threshold hold for a third qubit or "q[2]" is 500 μs. If the current coherence time for the third qubit is 400 μs, the processing device may determine that the execution environment requirement for the third qubit has been satisfied.

Then, the processing device may determine from the instructions in the QASM file, a subset of instructions associated with the qubit(s) whose requirement is satisfied by current state (i.e., instructions ready to be executed), and another subset of instructions involving a qubit(s) whose requirement is satisfied by the current state (i.e., instructions to be executed later at an optimal state of the quantum computer system). For example, continuing from the example above, the processing device may identify a group of instructions that involves the third qubit or q[2] from the QASM file. Examples of instructions including "q[2]" are illustrated in FIG. 4, as will be described below. However, if an instruction involves the third qubit as well as another qubit commanding the two qubits to be in an entangled state, for example, the processing device may not include such instruction in the group (unless both qubits' requirements are satisfied). The processing device may also determine another group of instructions involving a qubit(s) whose execution environment requirements are not satisfied.

The processing device may modify the QASM file to cause the execution of the subset of instructions associated with the qubit whose requirement(s) is satisfied. The processing device may also modify the QASM file to not cause or prevent execution of a second subset of instructions associated with a qubit(s) other than whose requirement(s) is satisfied. For example, the processing device may insert an annotation "//" for example to convert an instruction into a statement so that the quantum computer system may not recognize the annotated instruction as an instruction to be executed but rather, the quantum computer system may acknowledge the annotated instruction to be not executed. The processing device may then forward the modified QASM file for an execution of the instructions related to the qubit whose requirement(s) is satisfied to the quantum computer system.

On the other hand, to execute instructions of the qubit(s) whose requirements are not yet satisfied (including an instruction requiring the entangled state) at a later optimal time, the processing device may create a request including the instructions for the qubit(s) whose requirements are not yet satisfied and place the request in the queue. When the requirements of the qubit(s) are satisfied, the processing device may forward this request for execution.

Referring to FIG. 4, an example 400 of a QASM file in accordance with some examples of the present disclosure is shown. File 400 may include one or more instructions for implementing a quantum algorithm that involves qubits (e.g., instructions 419, 420, 421, 423, 430, 431, 433, 435, etc.). Each of the instructions may be a quantum instruction that can be executed by a quantum computer system. As illustrated, file 400 may include an instruction 419 defining a qubit size (e.g., a number of qubits) be used to implement the algorithm. File 400 may also include one or more instructions (e.g., 420, 421, 423, 430, 431, 433, 435) including information about one or more quantum gates to be used to perform an operation on a qubit(s).

File 400 may also include one or more statements (e.g., execution environment requirements (e.g., statements 411, 413, 415, and 417 may include an annotation "//@") as indicated by an annotation, '//'. For example, as illustrated in FIG. 4, file 400 may include a statement 411 specifying a scheduling optimization option and a statement 415 indicating an error rate threshold. Further examples of the execution environment requirement(s) may include a channel load rate (e.g., statement 415) and coherence time limit (e.g., statement 417), etc.

In an example where only a portion of instructions are sent for execution due to some qubits (e.g., qubits other than q[2] from the above example) whose execution environment requirements are not satisfied, the processing device may comment out or insert an annotation, "//" in front of instructions 430, 431, 433, and 435.

Referring to FIG. 5, method 500 begins at block 510 where a processing device may receive the request to execute the quantum algorithm. Details about the request are described above with respect to block 310. At 520, the processing device may determine an identifier of the quantum algorithm of the request (or an identifier of the request or the QASM file). The processing device may generate a unique identifier by hashing the quantum algorithm (e.g., performing a hash compilation on the quantum algorithm(s)). At block 530, the processing device may determine whether the quantum algorithm was previously executed in view of the identifier of the quantum algorithm. For example, the processing device may check entries in a data store (e.g., cache) that records results of the quantum algorithms with identifiers of the quantum algorithms. At block 540, responsive to determining that the quantum algorithm in the request was previously executed (i.e., in response to determining an entry that includes the identifier determined at block 520), the processing device may identify or determine the result of the execution of the quantum algorithm that is stored in view of the identifier of the quantum algorithm. In this way, the processing device may ensure that the previously executed quantum algorithm(s) is not executed again and save processing resources for another execution.

On the other hand, responsive to determining that the quantum algorithm in the request was not previously executed, at block 550, the processing device may send the request to execute the quantum algorithm to the quantum computer system to cause the execution of the quantum algorithm. In another example, the processing device may perform operations from 330 to 360 in FIG. 3, instead of block 550. At block 560, the processing device may receive a result of the execution of the quantum algorithm from the quantum computer system. At block 570, the processing device may store the result in association with the identifier of the quantum algorithm.

Figure 6:
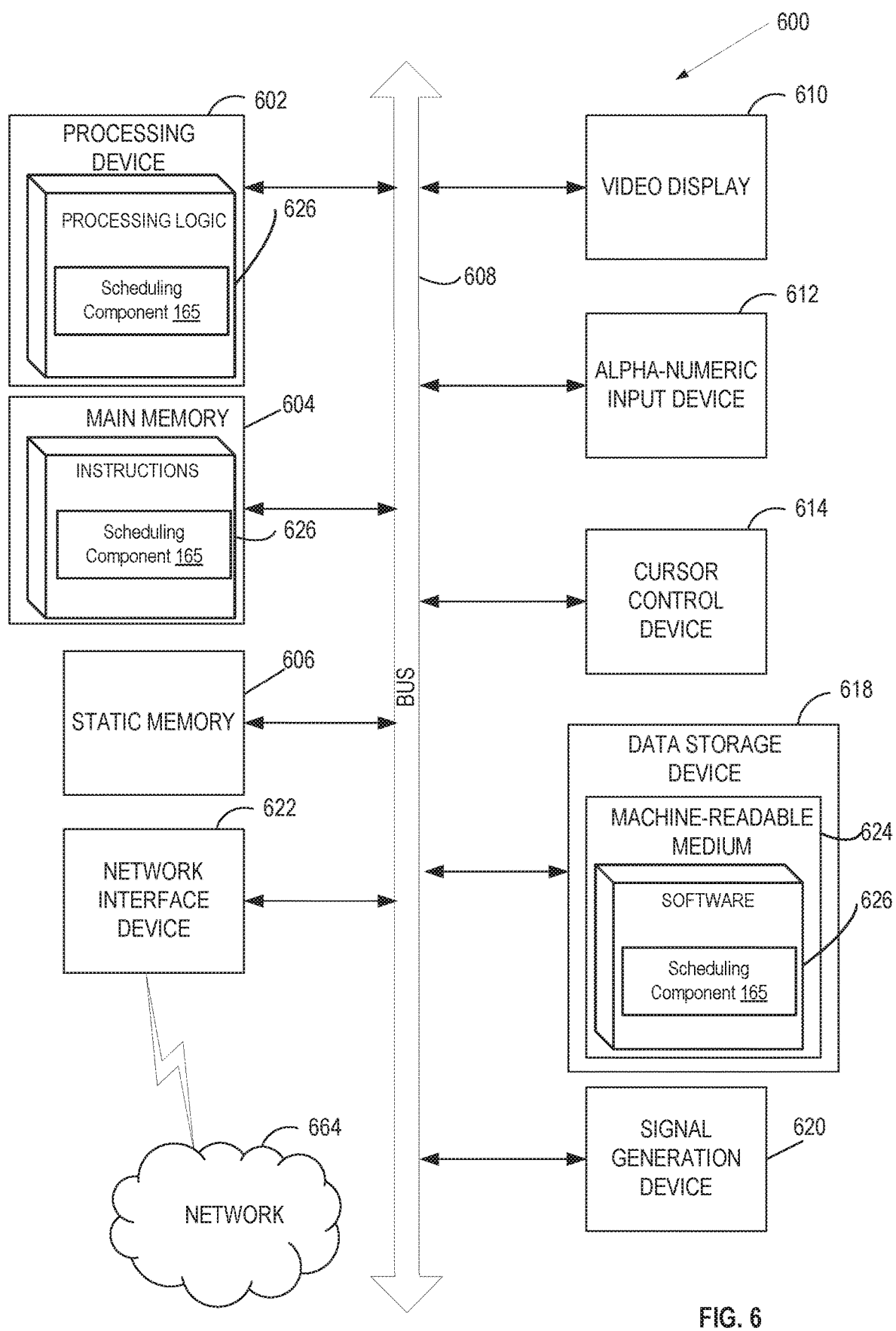
FIG. 6 illustrates a block diagram of one implementation of a computer system in accordance with some embodiments of the disclosure.

FIG. 6 illustrates a diagrammatic representation of a machine in the example form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may be a quantum computer or a classical computer. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 600 includes a processing device 602 (e.g., processor, CPU, etc.), a main memory 604 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 618, which communicate with each other via a bus 408.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 600 may further include a network interface device 622 communicably coupled to a network 664. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 618 may include a machine-accessible storage medium 624 on which is stored software 626 embodying any one or more of the methodologies of functions described herein. The software 626 may also reside, completely or at least partially, within the main memory 404 as instructions 626 and/or within the processing device 602 as processing logic 626 during execution thereof by the computer system 600; the main memory 604 and the processing device 602 also constituting machine-accessible storage media.

The machine-readable storage medium 624 may also be used to store instructions 626 to providing optimization recommendations for quantum computer systems, such as the scheduling component 165 as described with respect to FIGS. 1 and 2, and/or a software library containing methods that call the above applications. While the machine-accessible storage medium 624 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "forwarding," "sending," "storing," "performing," "detecting," "parsing," "checking," "generating," "determining," "searching," "modifying," "checking," "identifying," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and 500 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method comprising:
    receiving, at a server, a request to execute a quantum algorithm at a quantum computer system connected to the server, the request to execute the quantum algorithm comprising a plurality of instructions for implementing the quantum algorithm and one or more execution environment requirements, wherein the one or more execution environment requirements comprise one or more qubit state requirements with respect to one or more qubits provided by the quantum computer system;
    determining a state of the quantum computer system, the state of the quantum computer system comprising at least one of an error rate or a coherence time of the quantum computer system;
    determining whether the one or more execution environment requirements are satisfied in view of the state of the quantum computer system;
    responsive to determining that the one or more execution environment requirements are not satisfied in view of the state of the quantum computer system, causing an execution of the quantum algorithm to be delayed until the one or more execution environment requirements are satisfied; and
    responsive to determining that the one or more execution environment requirements are satisfied in view of the state of the quantum computer system, forwarding a modified request to execute the quantum algorithm to the quantum computer system to cause execution of a first subset of the plurality of instructions without causing execution of a second subset of the plurality of instructions for implementing the quantum algorithm, wherein the first subset of instructions is associated with a first qubit having a qubit state by which the one or more execution environment requirements are satisfied, and the second subset of instructions is associated with one or more qubits other than the first qubit.

2. The method of claim 1, wherein:
    the request to execute the quantum algorithm comprises a Quantum Assembly Language (QASM) file; and
    the determining of whether the one or more execution environment requirements are satisfied in view of the state of the quantum computer system comprises:
        identifying, from the request to execute the quantum algorithm, a statement starting with an annotation indicating an execution environment requirement by parsing the request to execute the quantum algorithm, and
        determining the execution environment requirement from the identified statement.

3. The method of claim 1, wherein the one or more execution environment requirements include at least one of:
    an error rate threshold for the quantum computer system,
    a channel load rate threshold for a quantum communication channel within the quantum computer system,
    a coherence time threshold for the quantum computer system, or
    a temperature threshold for a temperature of the quantum computer system.

4. The method of claim 1, wherein:
    the request to execute the quantum algorithm comprises a scheduling optimization option; and
    the determining of whether the one or more execution environment requirements are satisfied in view of the state of the quantum computer system further comprises:
        determining a particular execution environment requirement that is associated with the scheduling optimization option,
        determining whether the particular execution environment requirement is satisfied in view of the state of the quantum computer system, and
        responsive to determining that the particular execution environment requirement is satisfied, determining that the one or more execution environment requirements are satisfied.

5. The method of claim 1, wherein:
    determining that the one or more execution environment requirements are satisfied in view of the state of the quantum computer system comprises:
        identifying the first qubit provided by the quantum computer system having the state by which the one or more execution environment requirements are satisfied; and
    forwarding the modified request comprises:
        determining, from the plurality of instructions for implementing the quantum algorithm, the first subset of instructions associated with the first qubit, and
        modifying the request to execute the quantum algorithm to cause the execution of the first subset of instructions associated with the first qubit and to not cause execution of the second subset of instructions associated with the one or more qubits other than the first qubit.

6. The method of claim 1, further comprising:
    responsive to receiving the request to execute the quantum algorithm, determining an identifier of the quantum algorithm of the request; and
    responsive to receiving, from the quantum computer system, a result of the execution of the quantum algorithm, storing the result in association with the identifier of the quantum algorithm.

7. The method of claim 6, further comprising:
    responsive to receiving the request to execute the quantum algorithm, determining whether the quantum algorithm of the request was previously executed in view of the identifier of the quantum algorithm; and
    responsive to determining that the quantum algorithm in the request was previously executed, identifying the result of the execution of the quantum algorithm that is stored in view of the identifier of the quantum algorithm.

8. A system comprising:
    a memory; and
    a processing device operatively coupled to the memory, the processing device to:

receive a request to execute a quantum algorithm at a quantum computer system connected to the system, the request to execute the quantum algorithm comprising a plurality of instructions for implementing the quantum algorithm and one or more execution environment requirements, wherein the one or more execution environment requirements comprise one or more qubit state requirements with respect to one or more qubits provided by the quantum computer system;

determine a state of the quantum computer system, the state of the quantum computer system comprising at least one of an error rate or a coherence time of the quantum computer system;

determine whether the one or more execution environment requirements are satisfied in view of the state of the quantum computer system;

responsive to determining that the one or more execution environment requirements are not satisfied in view of the state of the quantum computer system, cause an execution of the quantum algorithm to be delayed until the one or more execution environment requirements are satisfied; and responsive to determining that the one or more execution environment requirements are satisfied in view of the state of the quantum computer system, forward a modified request to execute the quantum algorithm to the quantum computer system to cause execution of a first subset of the plurality of instructions without causing execution of a second subset of the plurality of instructions for implementing the quantum algorithm, wherein the first subset of instructions is associated with a first qubit having a qubit state by which the one or more execution environment requirements are satisfied, and the second subset of instructions is associated with one or more qubits other than the first qubit.

9. The system of claim 8, wherein:
the request to execute the quantum algorithm comprises a Quantum Assembly Language (QASM) file; and
to determine whether the one or more execution environment requirements are satisfied in view of the state of the quantum computer system, the processing device to:
identify, from the request to execute the quantum algorithm, a statement starting with an annotation indicating an execution environment requirement by parsing the request to execute the quantum algorithm, and
determine the execution environment requirement from the identified statement.

10. The system of claim 8, wherein the one or more execution environment requirements comprise at least one of:
an error rate threshold for the quantum computer system,
a channel load rate threshold for a quantum communication channel within the quantum computer system,
a coherence time threshold for the quantum computer system, or
a temperature threshold for a temperature of the quantum computer system.

11. The system of claim 8, wherein:
the request to execute the quantum algorithm comprises a scheduling optimization option; and
to determine whether the one or more execution environment requirements are satisfied in view of the state of the quantum computer system, the processing device to:
determine a particular execution environment requirement that is associated with the scheduling optimization option,
determine whether the particular execution environment requirement is satisfied in view of the state of the quantum computer system, and
responsive to determining that the particular execution environment requirement is satisfied, determine that the one or more execution environment requirements are satisfied.

12. The system of claim 8, wherein:
to determine that the one or more execution environment requirements are satisfied in view of the state of the quantum computer system, the processing device to:
identify the first qubit provided by the quantum computer system having the state by which the one or more execution environment requirements are satisfied; and
to forward the modified request, the processing device to:
determine, from the plurality of instructions for implementing the quantum algorithm, the first subset of instructions associated with the identified first qubit, and
modify the request to execute the quantum algorithm to cause the execution of the first subset of instructions associated with the identified first qubit and to not cause execution of the second subset of instructions associated with the one or more qubits other than the first qubit.

13. The system of claim 8, the processing device to further:
responsive to receiving the request to execute the quantum algorithm, determine an identifier of the quantum algorithm of the request; and
responsive to receiving, from the quantum computer system, a result of the execution of the quantum algorithm, store the result in association with the identifier of the quantum algorithm.

14. The system of claim 13, the processing device to further:
responsive to receiving the request to execute the quantum algorithm, determine whether the quantum algorithm of the request was previously executed in view of the identifier of the quantum algorithm; and
responsive to determining that the quantum algorithm in the request was previously executed, identify the result of the execution of the quantum algorithm that is stored in view of the identifier of the quantum algorithm.

15. A non-transitory machine-readable storage medium including instructions that, when accessed by a processing device, cause the processing device to:
receive a request to execute a quantum algorithm at a quantum computer system connected to the system, the request to execute the quantum algorithm comprising a plurality of instructions for implementing the quantum algorithm and one or more execution environment requirements, wherein the one or more execution environment requirements comprise one or more qubit state requirements with respect to one or more qubits provided by the quantum computer system;
determine a state of the quantum computer system, the state of the quantum computer system comprising at least one of an error rate or a coherence time of the quantum computer system;
determine whether the one or more execution environment requirements are satisfied in view of the state of the quantum computer system;

responsive to determining that the one or more execution environment requirements are not satisfied in view of the state of the quantum computer system, cause an execution of the quantum algorithm to be delayed until the one or more execution environment requirements are satisfied; and responsive to determining that the one or more execution environment requirements are satisfied in view of the state of the quantum computer system, forward a modified request to execute the quantum algorithm to the quantum computer system to cause execution of a first subset of the plurality of instructions without causing execution of a second subset of the plurality of instructions for implementing the quantum algorithm, wherein the first subset of instructions is associated with a first qubit having a qubit state by which the one or more execution environment requirements are satisfied, and the second subset of instructions is associated with one or more qubits other than the first qubit.

16. The non-transitory machine-readable storage medium of claim 15, wherein:

the request to execute the quantum algorithm comprises a Quantum Assembly Language (QASM) file; and to determine whether the one or more execution environment requirements are satisfied in view of the state of the quantum computer system, the processing device to:

identify, from the request to execute the quantum algorithm, a statement starting with an annotation indicating an execution environment requirement by parsing the request to execute the quantum algorithm, and determine the execution environment requirement from the identified statement.

17. The non-transitory machine-readable storage medium of claim 15, wherein the one or more execution environment requirements comprise at least one of:

an error rate threshold for the quantum computer system, a channel load rate threshold for a quantum communication channel within the quantum computer system, a coherence time threshold for the quantum computer system, or a temperature threshold for a temperature of the quantum computer system.

18. The non-transitory machine-readable storage medium of claim 15, wherein:

the request to execute the quantum algorithm comprises a scheduling optimization option; and to determine whether the one or more execution environment requirements are satisfied in view of the state of the quantum computer system, the processing device to:

determine a particular execution environment requirement that is associated with the scheduling optimization option, determine whether the particular execution environment requirement is satisfied in view of the state of the quantum computer system, and responsive to determining that the particular execution environment requirement is satisfied, determine that the one or more execution environment requirements are satisfied.

19. The non-transitory machine-readable storage medium of claim 15, wherein:

to determine that the one or more execution environment requirements are satisfied in view of the state of the quantum computer system, the processing device to:

identify the first qubit provided by the quantum computer system having the state by which the one or more execution environment requirements are satisfied; and to forward the modified request, the processing device to:

determine, from the plurality of instructions for implementing the quantum algorithm, the first subset of instructions associated with the identified first qubit, and modify the request to execute the quantum algorithm to cause the execution of the first subset of instructions associated with the identified first qubit and to not cause execution of the second subset of instructions associated with the one or more qubits other than the first qubit.

20. The non-transitory machine-readable storage medium of claim 15, further comprising:

responsive to receiving the request to execute the quantum algorithm:

determine an identifier of the quantum algorithm of the request, and determine whether the quantum algorithm of the request was previously executed in view of the identifier of the quantum algorithm; and responsive to determining that the quantum algorithm in the request was previously executed, identify a result of the execution of the quantum algorithm that is stored in view of the identifier of the quantum algorithm.

* * * * *